(12) United States Patent
Reeves

(10) Patent No.: US 6,310,955 B1
(45) Date of Patent: Oct. 30, 2001

(54) METHODS AND APPARATUS FOR ENABLING PORTABLE TELEPHONE HANDSET TO AUTOMATICALLY GO OFF-HOOK

(75) Inventor: Mark David Reeves, Howell, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/097,835

(22) Filed: Jun. 16, 1998

(51) Int. Cl.[7] .................................................. H04M 1/00
(52) U.S. Cl. ................................................ 379/424; 379/433
(58) Field of Search .................................. 379/32–33, 130, 379/161, 184, 194–195, 377, 379, 381, 387, 422, 424–427, 433

(56) References Cited

U.S. PATENT DOCUMENTS

| | | | |
|---|---|---|---|
| 5,337,353 | * | 8/1994 | Boie et al. ............................ 379/424 |
| 5,715,311 | * | 2/1998 | Sudo et al. ........................... 379/433 |
| 5,918,188 | * | 6/1999 | Doran .................................. 379/433 |
| 5,987,119 | * | 11/1999 | Lee ..................................... 379/379 |

FOREIGN PATENT DOCUMENTS

| | | | |
|---|---|---|---|
| 62-003546 | * | 1/1987 | (JP) ..................................... 379/422 |
| 02-205151 | * | 8/1990 | (JP) ..................................... 379/424 |
| 02-277351 | * | 11/1990 | (JP) ..................................... 379/424 |

* cited by examiner

*Primary Examiner*—Curtis Kuntz
*Assistant Examiner*—George Eng
(74) *Attorney, Agent, or Firm*—Priest & Goldstein, PLLC

(57) ABSTRACT

A system for setting a wireless handset to an offhook condition when the handset is moved during the presence of a specified condition, such as an incoming call. A signal is sent to the handset to indicate an incoming call. If the handset is moved during the pendency of the incoming call, a sensor sends a signal to a controller indicating movement of the handset. A dedicated circuit may be employed to send an offhlook signal only when a movement threshold has been detected. If the signal reaches a predetermined threshold, the controller sets the handset to an offhook condition.

5 Claims, 8 Drawing Sheets

METHODS AND APPARATUS FOR ENABLING PORTABLE TELEPHONE HANDSET TO AUTOMATICALLY GO OFF-HOOK

FIELD OF THE INVENTION

The present invention relates generally to improvements in portable telephony. More particularly, the invention relates to methods and apparatus for causing a portable telephone handset to go off-hook when picked up.

BACKGROUND OF THE INVENTION

Wireless telephones are becoming increasingly common. Wireless telephones include both cellular telephones and wireline telephones having a base station and a wireless handset. In a cellular system the wireless operation is what makes the entire system possible. In the wireline system, the ability of the telephone to operate without a wire connected to the handset is a significant convenience to the user.

In both cellular and wireline systems, the wireless receiver must typically be manually placed into an off-hook position in order to place a call or answer an incoming call. For example, the user removes a wired line handset for its base or presses a button. The need to press a button can be an inconvenience to the user. In poor light, a user may not be able to see the keys and may have difficulty pressing the correct key. A user may not have both hands free, and it may be inconvenient in such a case for a user to both hold the handset and press a button to set the telephone to an off-hook condition. In each case it may be more convenient for the user to set the telephone to an off-hook condition by moving or disturbing the handset, without the necessity to make a precise motion needed to select and press a particular button.

There exists, therefore, a need in the art for a wireless telephone handset which can be set to an off-hook condition by movement of the handset particularly when the handset is not in a charging cradle. Such operation has the benefit of being familiar to users of standard wired telephones which are offhook whenever the handset is picked up.

SUMMARY OF THE INVENTION

An automatic off look system according to the present invention may suitably include a base station and a handset. When the base station receives an incoming call signal from a central office, the central office sends a ring signal to the base station and the base station sends a signal to the handset. The handset includes a controller which receives the ring signal. The handset also includes a sensor. The controller is operative to receive a signal from the sensor or a keypress from a keypad on the handset. During the pendency of the call, the controller looks for a keypress or a signal from the sensor. If the controller detects a keypress, the controller immediately sets the handset to an offhook condition. If the controller receives a signal from the sensor, the signal is preferably evaluated to determine if it meets a threshold sufficient to indicate that it is desired to set the handset to an offhook condition. If the signal meets the threshold, the controller sets the telephone to an offhook condition. If the signal does not meet the threshold, the controller resumes looking for a keypress or a signal from the sensor.

A more complete understanding of the present invention, as well as further features and advantages of the invention, will be apparent from the following Detailed Description and the accompanying drawings.

DETAILED DESCRIPTION

Figure 1:
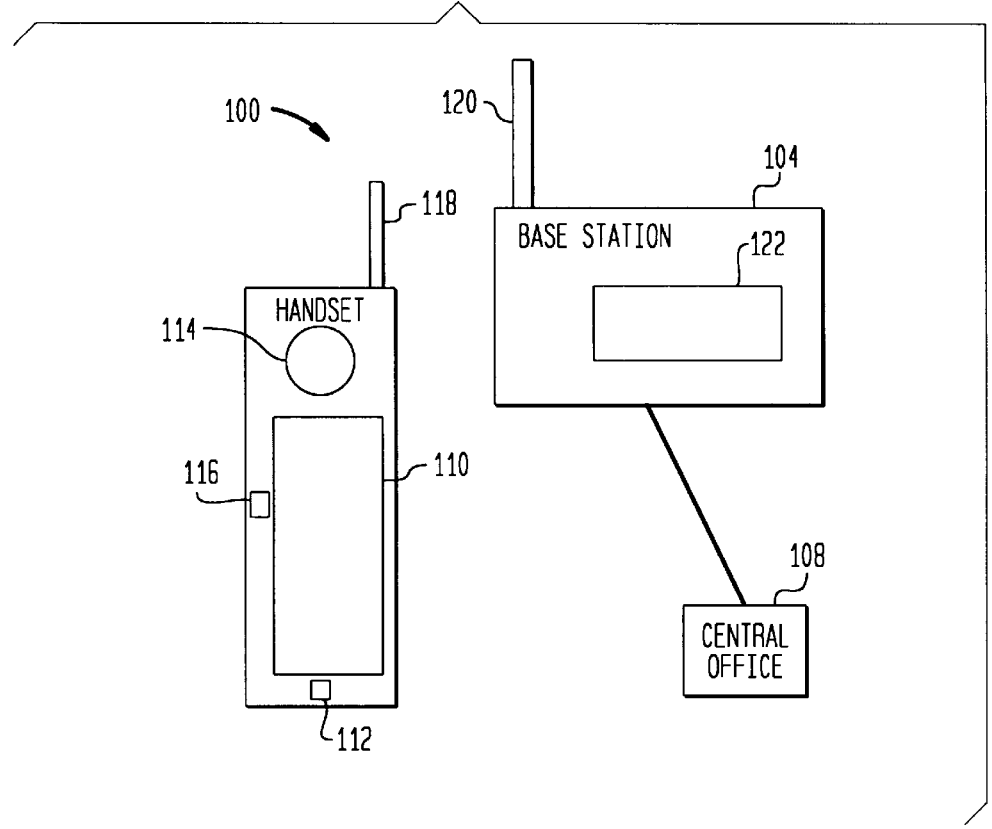
FIG. 1 illustrates a wireless telephone system including an automatic handset according to an aspect of the present invention.

FIG. 1 illustrates a wireless telephone system 100 including an automatic handset 102 according to the present invention. The telephone system 100 includes a base station 104 which is connected by a wireline 106 to a central office 108. The handset 102 includes a keypad 110, a microphone 112, a speaker 114 and an alerter 116. The alerter 116 may be a small speaker which emits a ring or other alert tone, or may alternatively be a silent alerter such as a vibrator. The handset 102 also includes an antenna 118. The base station 104 includes an antenna 120, as well as a charging cradle 122.

When a call is directed to the base station 104, the base station sends a signal to the handset 102. The alerter 116 on the handset 102 gives an alert signal (typically by ringing) and the user picks up the handset 102. The act of picking up the handset 102 causes a state change, as discussed further below, so that the handset 102 goes into an off-hook condition, transmitting an appropriate signal to the base station 104. The base station 104 relays the state change to the central office 108, and the call is connected.

Figure 2:
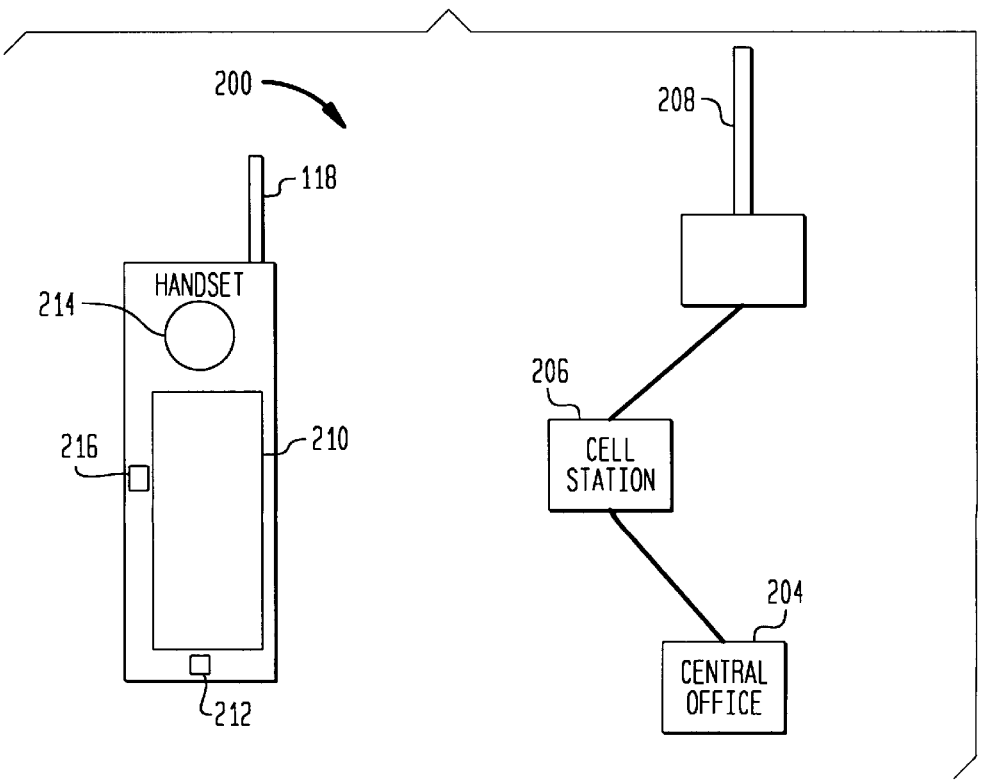
FIG. 2 illustrates a cellular telephone system including an automatic handset according to an aspect of the present invention.

FIG. 2 illustrates a cellular telephone system 200 including an automatic handset 202 according to the present invention. The telephone system 200 includes a central office 204, which communicates with a set of cell stations, of which cell station 206 is a representative example. Cell station 206 communicates with all handsets within its service area, or cell, through antenna 208. The handset 202 includes a keypad 210, microphone 212, speaker 214 and alerter 216. The alerter 216 may be a speaker which emits a ringing tone, or alternatively a vibrator may be employed. When a call is directed to the handset 202, the central office 204 sends a signal to the cell station 206. The cell station 206 transmits a signal through antenna 208 to handset 202 directing handset 202 to activate alerter 216 and enabling handset 202 to receive a call. If the user picks up the handset 202, the act of picking up the handset causes a state change which causes the handset 202 to go off-hook and transmit a signal to cell station 206 that the call has been accepted. This signal directs cell station 206 and central office 204 to connect the call.

Figure 3:
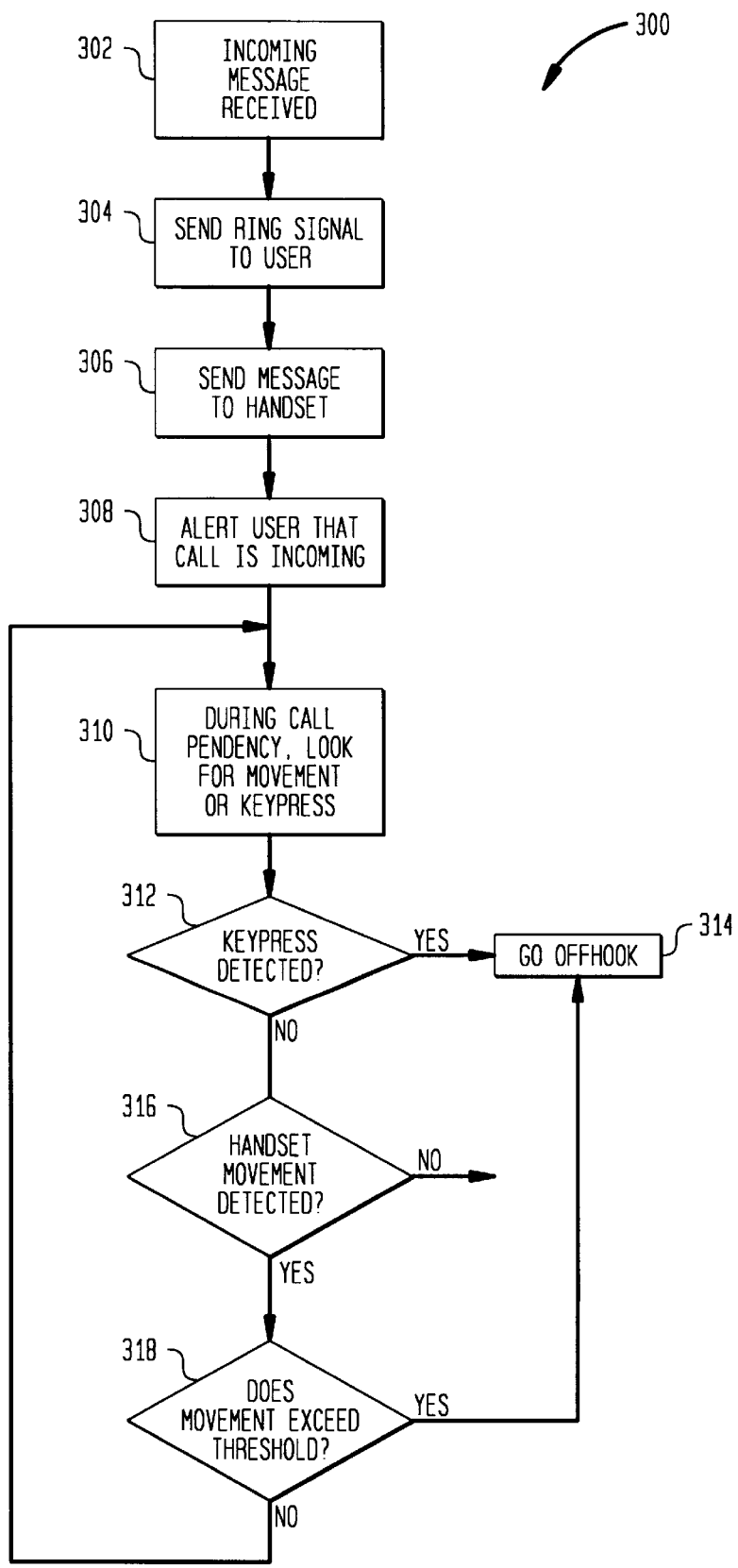
FIG. 3 illustrates a method for automatically setting a wireless telephone system handset to an offhook condition according to the present invention.

FIG. 3 is a flowchart illustrating the steps of a method 300 for automatically setting a wireless telephone handset to an offhook condition according to an aspect of the present invention. In step 302 a central office receives a message that a call is incoming to a user. Control is then passed to step 304, and the central office sends a ring signal to the user. At step 306, a base at the user's location detects a ring signal and sends a message to an associated handset. The message is preferably sent by means of a local radio signal. At step 308, the handset receives the ring message and alerts the user that a call is incoming. This alert is typically provided by sounding an audio signal. At step 310, the handset begins to look for handset movement or a keypress. By way of example, a suitably programmed processor interrogates a movement sensor and the keypad keys to detect a switch closure. Alternatively, a dedicated circuit or ASIC may be employed. At step 312, conditions are evaluated to determine if a keypress has occurred. While his exemplary embodiment addresses a keypress, a voice recognition or detection circuit could detect a user speaking, or other detection circuitry could detect the occurrence of some other criteria. If a keypress has occurred, control is transferred to step 314 and the handset goes offhook. If no keypress has occurred, control is transferred to step 316 to evaluate conditions to determine if handset movement has occurred. If handset movement has occurred, control is transferred to step 318 and the movement is evaluated to determine if it is sufficient to indicate that the user has picked up the handset to use it. If the movement is sufficient, control is passed to step 314 and the handset goes offhook. If the movement is insufficient, control is transferred to step 310 and the handset resumes waiting for handset movement or a keypress.

Figure 4:
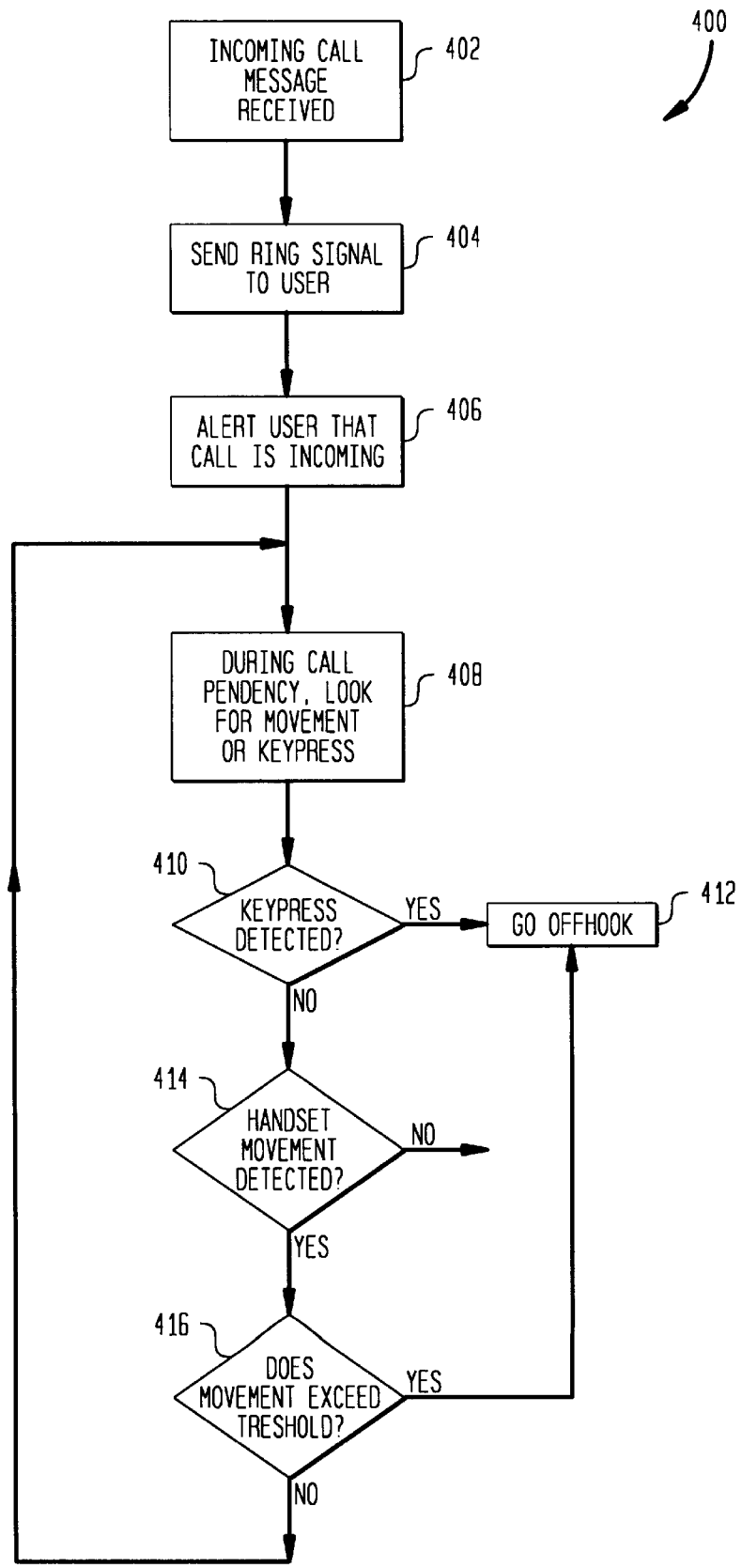
FIG. 4 illustrates a method for automatically setting a cellular telephone system handset to an offhook condition according to the present invention.

FIG. 4 is a flowchart illustrating a method 400 according to an aspect of the present invention for automatically setting a cellular telephone handset to an offhook condition. At step 402, a central office receives a message that a call is incoming to a user. Control is then passed to step 404 and the central office sends a ring signal to the user. At step 406, the handset receives the ring signal and alerts the user that a call is incoming. This is typically done by sounding an audio signal. At step 408 the handset looks for handset movement or a keypress. At step 410, conditions are evaluated to determine if a keypress has occurred. If a keypress has occurred, control is transferred to step 412 and the handset goes offhook. If no keypress has occurred, control is transferred to step 414 to evaluate conditions to determine if handset movement has occurred. If handset movement has occurred, control is transferred to step 416 and the movement is evaluated to determine if it is sufficient to indicate that the user has picked up the handset. If the movement is sufficient, control is passed to step 412 and the handset goes offhook. If the movement is insufficient, control is transferred to step 408 and the handset resumes waiting for handset movement or a keypress.

Figure 5:
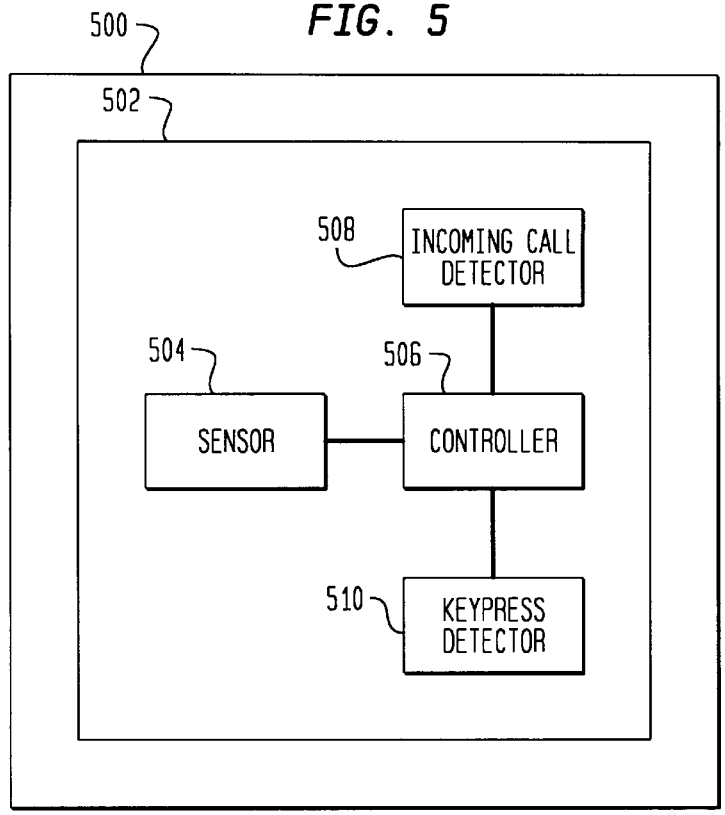
FIG. 5 illustrates a telephone handset employing an automatic offhook system according to the present invention.

FIG. 5 illustrates a telephone handset 500 employing an automatic offhook system 502 according to an aspect of the present invention. The telephone handset 500 in which the offhook system 502 is employed may suitably be either a wireless or cellular telephone handset. Offhook system 502 includes a sensor 504 and a controller 506. The controller 506 receives inputs from an incoming call detector 508 and a keypress detector 510.

When the telephone handset 500 in which the offhook system 502 is operating receives a call, the incoming call detector 508 detects the incoming call and sends an incoming call signal to the controller 506. When the controller 506 receives the incoming call signal, it is enabled to detect inputs from the sensor 504 and the keypress detector 510.

If the user presses a key during the pendency of an incoming call, the keypress detector sends a keypress signal to the controller 506. The controller 506 immediately sets the handset 500 to an offhook condition.

If no key is detected as having been pressed during the pendency of the incoming call, no keypress signal is sent to the controller. However, if the sensor 504 detects movement during the pendency of the call, the sensor 504 sends an interrupt to the controller 506. The interrupt includes information about the degree of movement detected. The controller recognizes the interrupt and evaluates the degree of movement and determines if it is enough to indicate that the handset has been picked up. If the degree of movement is sufficient, the controller 506 sets the handset 500 to an offhook condition. Otherwise, the controller 506 rejects the signal and resumes waiting for a signal from the sensor 504. Alternatively, controller 506 may be programmed to poll the sensor 504.

Alternatively, the sensor 504 can be designed so that the degree of movement necessary to cause an interrupt to be sent is sufficient to indicate that the handset 500 has been picked up. In this design, the processor 508 does not need to evaluate the degree of movement, but simply sets the handset 500 to an offhook condition whenever the sensor 504 sends an interrupt during a pending call, or otherwise is determined to have sensed a predetermined degree of movement.

As an alternative to setting the handset 500 to an offhook condition during an incoming call, the controller 506 may be designed to detect the presence of a predefined condition and to set the handset 500 to an offhook condition when the controller 506 receives a proper signal from the sensor 504 while the condition exists. For example, the controller 506 may receive a keypress signal from the keypress detector 510, indicating that the handset 500 has been placed in a standby condition, to be taken offhook automatically when the handset 500 is picked up. If a user desires to make a call while the handset 500 is in this condition, the act of picking up the handset 500 causes the sensor 504 to send a signal to the controller 506, causing the controller 506 to set the handset 500 to an offhook condition.

Figure 6:
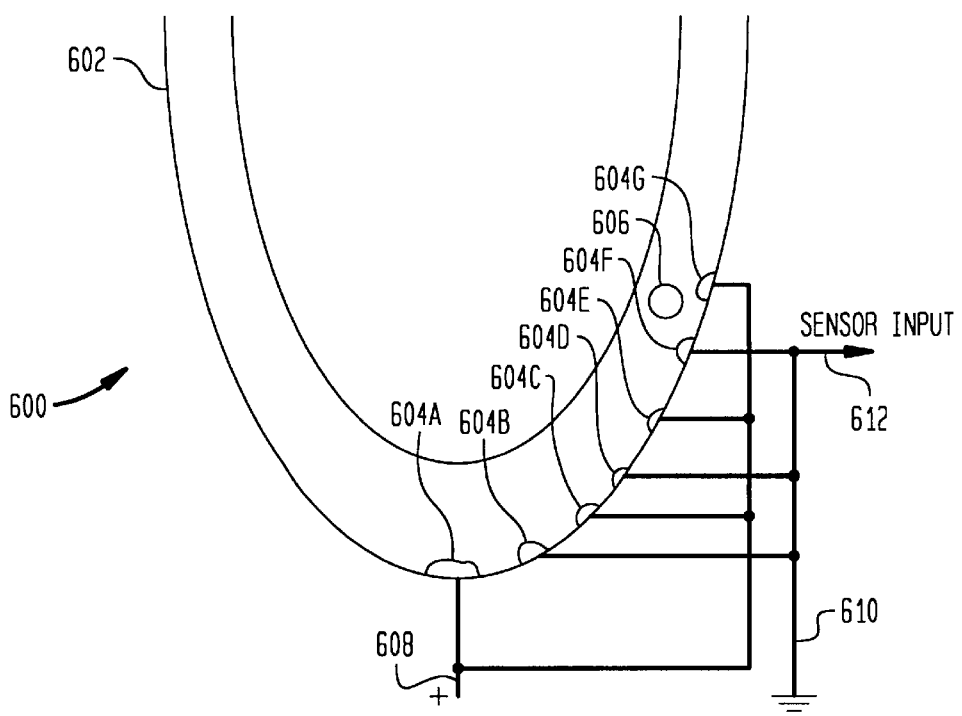
FIG. 6 illustrates one suitable movement sensor which may be employed in conjunction with the present invention.

FIG. 6 illustrates a movement sensor 600 according to an aspect of the present invention. The sensor 600 includes a generally U-shaped tube 602 lined with a series of electrical contacts of which contacts 604A–604G are representative examples. The tube 602 contains a metal ball 606, which is able to roll freely within the tube. The contacts 604A–604G are shaped so as to allow the ball 606 to make a contact between a pair of contacts points 604A–604G. Adjacent ones of the contact points 604A–604G are connected to a voltage source 608 and a ground 610, respectively. That is, point 604A is connected to a voltage source, point 604B is connected to a ground, point 604C is connected to a voltage source, and so on. Each of the contact points 604A–604G is also connected to a sensor input 612. As the sensor 600 is moved, the ball 606 rolls over the contacts 604A–604G, always seeking the lowest point. The contact points 604A–604G thus provide a series of high and low voltages to the controller 612. The controller 612 is able to sense the changing voltage levels to sense the degree of movement of the sensor 600. A plurality of sensors similar to sensor 600 can be placed on a telephone in various orientations in order to provide detection through different axes of motion. Moreover, the tube 602 can be designed in any of various lengths and shapes to expand or limit the degree of movement that is able to be sensed.

Figure 7A:
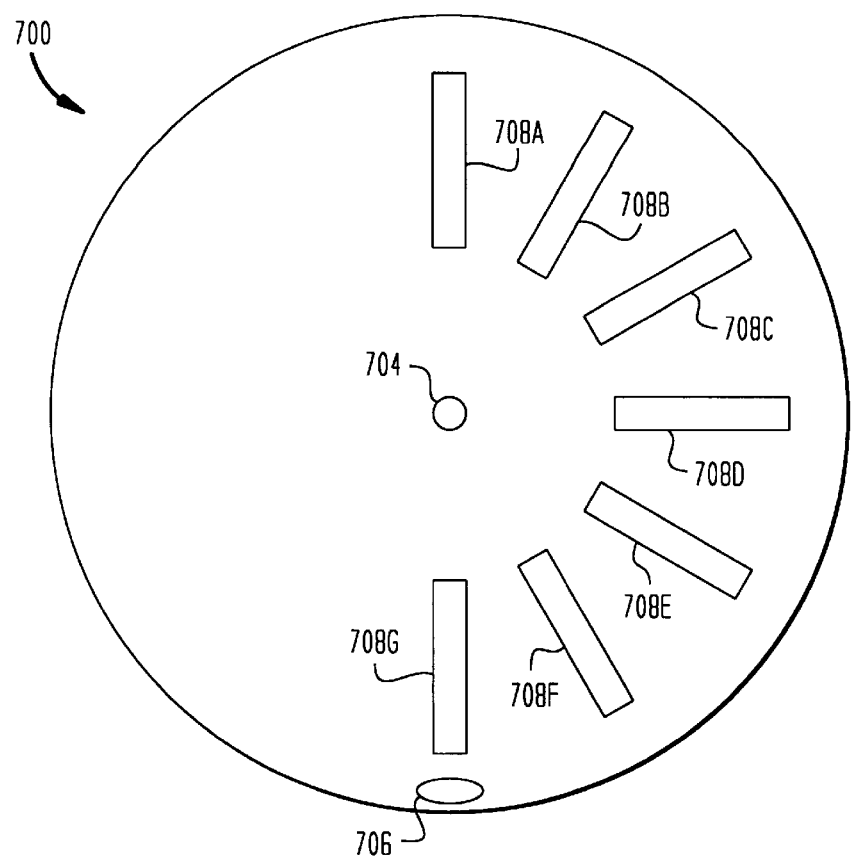
FIG. 7A illustrates a front view of a movement sensor according to an alternative aspect of the present invention.

FIG. 7A is a front view of a movement sensor 700 according to an alternative aspect of the present invention. Sensor 700 includes a wheel 702 attached to a support shaft 704. The wheel 702 includes an attached weight 706, which causes the wheel 702 to rotate so that the weight 706 is at the lowest point of the wheel 702. The wheel 702 includes a pattern of opaque and transparent areas, preferably achieved by making the wheel 702 of an opaque material, and including in the area of the wheel 702 a series of transparent areas such as slots 708A–708G.

Figure 7B:
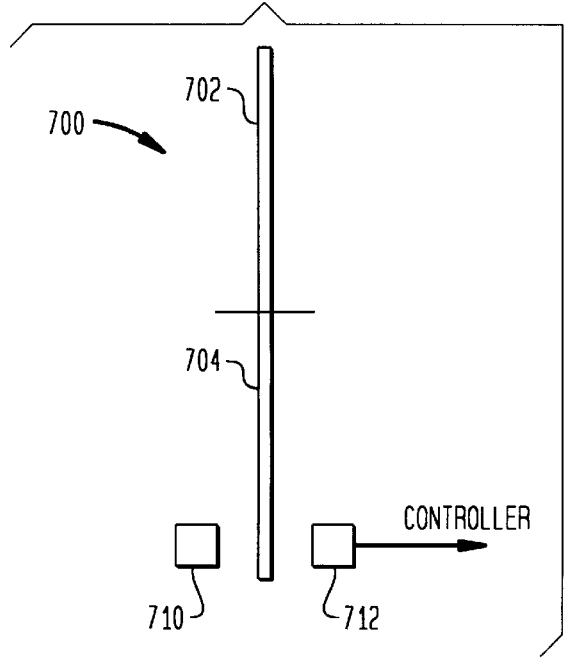
FIG. 7B illustrates a side view of the movement sensor of FIG. 7A.

FIG. 7B illustrates an alternate view of the sensor 700 showing a profile view of the wheel 702 illustrated in FIG. 7. The wheel 702 is mounted on the support shaft 704. The wheel 702 is positioned between a paired LED 710 and photodetector such as photodiode 712. As a telephone in which the wheel 702 is preferably included is picked up, the wheel rotates. As the wheel rotates, solid areas of the wheel 702 and slots 708A–708G pass between the LED 710 and the photodiode 712, causing a changing light level to be received by the photodiode 712. The changing light level produces a changing signal in the photodiode 712, which is sent to a controller 714 to sense movement in the sensor 700. A plurality of sensors 700 can be provided in a single handset in different orientations to sense movement in different axes.

Figure 8:
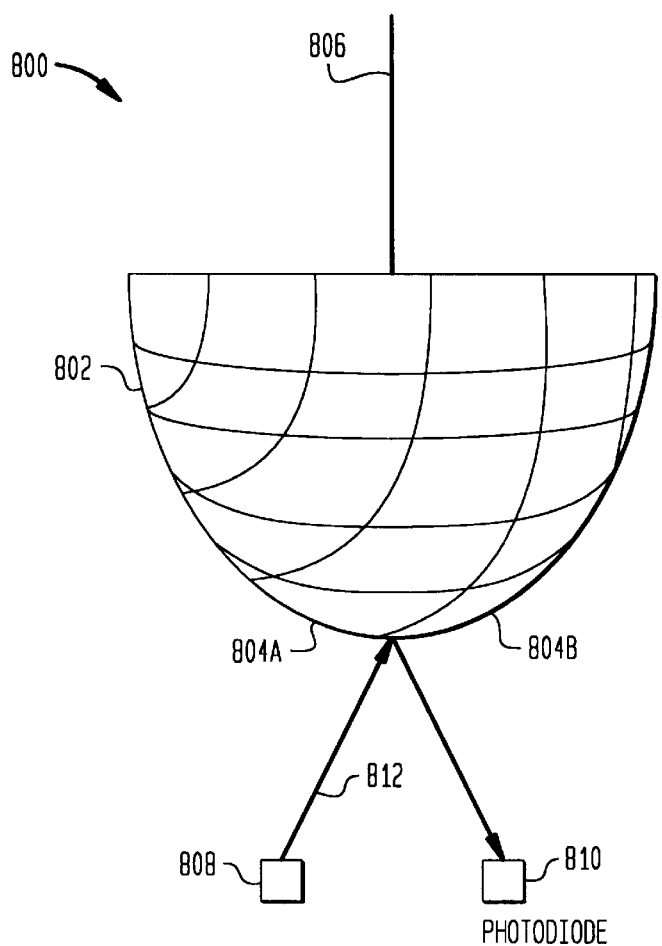
FIG. 8 illustrates a movement sensor according to an alternative aspect of the present invention.

FIG. 8 illustrates a movement sensor 800 according to an alternative aspect of the present invention. The sensor 800 includes a reflective surface 802 marked with a pattern of alternating areas of high and low reflectivity of which areas 804A and 804B are representative examples. The surface 802 is suspended by a mechanical support 806. Alternatively, the surface 802 may be suspended by floating in a liquid. The sensor includes a paired LED 808 and a photosensor 810, with a light beam 812 from the LED being reflected off the surface 802 to the photosensor 810. In this embodiment, the photo sensor is preferably a photo diode, but other sensors may suitably be employed. As the sensor 800 is moved, different ones of the areas such as 804A and B move into the path of the light beam emitted by the LED, causing a changing light level to be detected by the photo sensor 810. The photosensor 810 therefore produces a varying signal, which can be supplied to a controller to indicate movement of the sensor 800.

Figure 9:
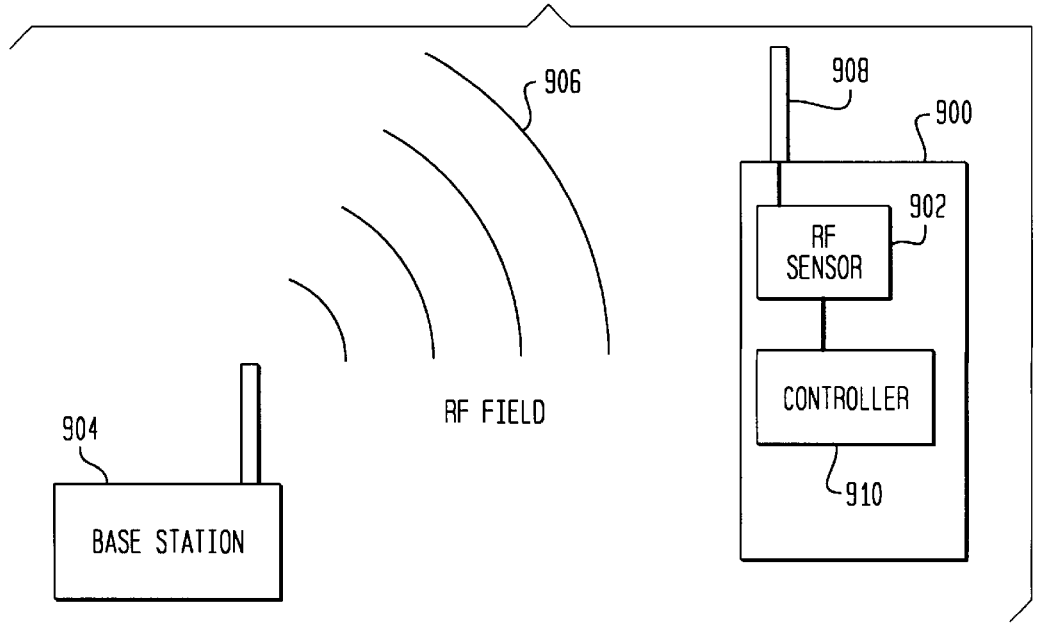
FIG. 9 illustrates a movement sensor employing detection of a radio frequency (RF) field according to an aspect of the present invention.

FIG. 9 illustrates a handset 900 featuring an RF sensor 902 according to another aspect of the present invention. The handset 900 is located within range of a base station 904, which emits an RF field 906. The handset 900 includes an antenna 908, which is connected to the RF sensor 902. The RF sensor 902 is also connected to a controller 910. Movement of the handset 900 within the RF field 906 causes the RF sensor 902 to detect varying field strength and phase. As the RF sensor detects the varying field strength and phase, it passes a signal to a controller 914. The signal to the controller 910 varies in accordance with the variations in RF field strength and phase detected by the RF sensor 902, and is used by the controller 910 to detect movement of the handset 900.

Figure 10:
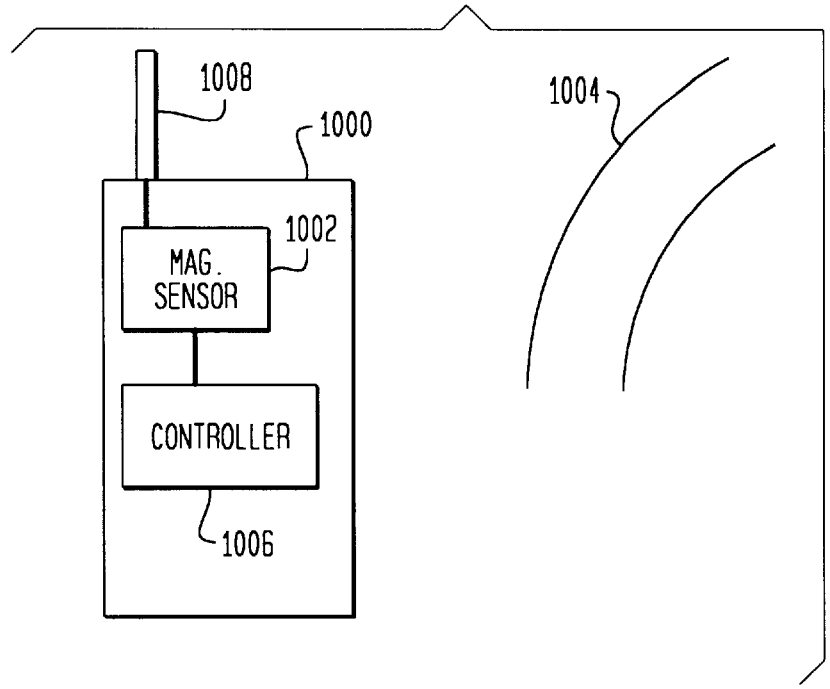
FIG. 10 illustrates a movement sensor employing detection of the magnetic field of the earth according to an aspect of the present invention.

FIG. 10 illustrates an alternative handset 1000 equipped with magnetic Field sensor 1002, which detects variations in field strength and phase of the magnetic field 1004 of the earth. The handset 1000 may include an antenna 1008 which, in addition to transmitting signals to and from the handset 1000, may also be connected to magnetic sensor 1002 for use in detecting variations in the magnetic field 1004. As the handset 1000 moves within the earth's magnetic field 1004, magnetic sensor 1002 detects field strength changes and passes a signal reflecting the field strength changes to a controller 1006. It will be recognized that additional sensor or sensors may be employed to detect when a user holds the other side of handset 1100. The controller 1006 analyzes the signal to detect movement of the handset 1000.

Figure 11:
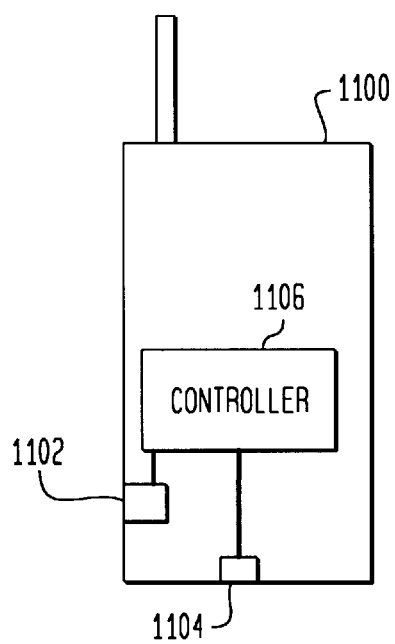
FIG. 11 illustrates a sensor employing detection of changes in an ambient light level according to an aspect of the present invention.

FIG. 11 illustrates a handset 1100 including a plurality of photodiodes including a first photodiode 1102 and a second photodiode 1104, used to implement an automatic offhook system according to an aspect of the present invention. The first photodiode 1102 is preferably located at the base of the handset 1100, such that ambient light to the first photodiode 1102 is blocked while the handset 1102 is resting on its base. When the handset 1100 is picked up, the first photodiode 1102 detects a changing light level and sends a signal to a controller 1106. Upon detection of the signal, the controller 1106 sets the handset 1100 to an offhook condition.

The second photodiode 1104 is located on a side of the handset 1100, such that light to the second photodiode 1104 will be blocked when a user grasps the handset 1104. When light to the second photodiode is blocked, the second photodiode 1104 detects a changing light level and sends a signal to the controller 1106. It will be recognized that an additional sensor or sensors may be arranged to detect when a user holds the other side of handset 1100, or holds the handset in other positions. Upon detection of the signal, the controller 1106 sets the handset 1100 to an offhook condition. The controller 1106 can be designed so that the handset is set to an offhook condition upon detection of a changing, light level by either first photodiode 1102 or second photodiode 1104. Alternatively, the controller 1106 can be designed to require detection of a changing light level by both first photodiode 1102 and second photodiode 1104 to set the handset to an offhook condition.

Figure 12:
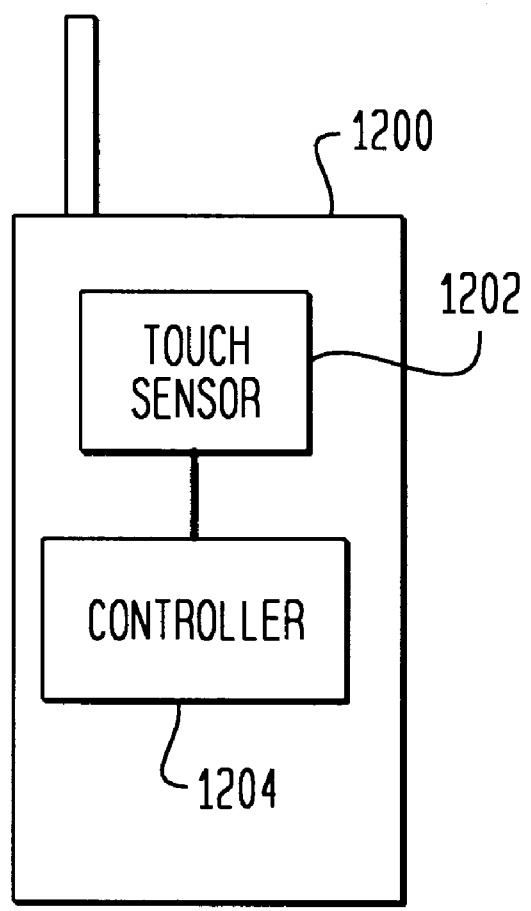
FIG. 12 illustrates a sensor employing detection of a touch by a user according to an aspect of the present invention.

FIG. 12 illustrates a handset 1200 including a touch sensor 1202 used to implement an automatic offhook system according to an alternative aspect of the present invention. The touch sensor 1202 is shown here as a separate device on the handset 1200, but may also be designed into the handset. When the user grasps the handset 1200, the touch sensor 1202 detects the user's touch through, for example, pressure or temperature changes. Alternatively, the touch sensor may be a capacitive or other type of sensor. The touch sensor 1202 passes a signal to a controller 1204, which sets the handset 1200 to an offhook condition in response to the signal.

While the present invention is disclosed in the context of a presently preferred embodiment, it will be recognized that a wide variety of implementations may be employed by persons of ordinary skill in the art consistent with the above discussion and the claims which follow below. By way of example, a chip set, such as the chip sets used with global positioning satellite systems, might be employed to determine if a signal relative to the position of an antenna in the handset had changed should the cost of such chip sets make such an approach cost effective.

I claim:

1. An automatic offhook system for use in a telephone handset, comprising:

an incoming call detector;

a movement sensor for detecting a change in condition of the handset, the sensor comprising a tube, a series of electrical contacts placed along the tube, adjacent contacts being connected to differing voltages and a conductive ball positioned to roll along the tube during movement of the handset, the rolling of the ball providing an electrical connection between adjacent contacts resulting in a series of voltage changes caused by the connection of different ones of the adjacent contacts; and a controller responsive to the incoming call detector and the sensor, the controller being operative to set the handset to an offhook condition when the sensor detects a change in condition of the handset during a pendency of an incoming call detected by the incoming call detector, the controller being operative to receive information from the sensor indicating a degree of movement of the handset and to set the handset to an offhook condition if the degree of movement detected by the sensor reaches a predetermined threshold and to leave the handset in a non-offhook condition if the degree of movement does not reach the predetermined threshold.

2. The offhook system of claim 1 wherein the tube is generally U-shaped.

3. An automatic offhook system for use in a telephone handset, comprising:

an incoming call detector;

a movement sensor for detecting a change in condition of the handset, the sensor comprising a an axis, a wheel mounted on the axis, the wheel being able to rotate freely, one portion of the wheel being weighted so that the weighted portion of the wheel always seeks a lowest position, the wheel having an alternating series of opaque and transparent areas along its circumference and a light source and a light detector positioned on opposite sides of the wheel so that light passes from the light source to the light detector when a transparent portion of the wheel is between the light source and the light detector so that rotation of the wheel caused by movement of the handset brings an alternating series of opaque and transparent portions of the wheel between the light source and the light detector, causing the light detector to detect alternating periods of light and dark and to produce a series of alternating voltages caused by the alternating periods of light and dark; and a controller responsive to the incoming call detector and the sensor, the controller being operative to set the handset to an offhook condition when the sensor detects a change in condition of the handset during a pendency of an incoming call detected by the incoming call detector, the controller being operative to receive information from the sensor indicating a degree of movement of the handset and to set the handset to an offhook condition if the degree of movement detected by the sensor reaches a predetermined threshold and to leave the handset in a non-offhook condition if the degree of movement does not reach the predetermined threshold.

4. The system of claim 3 wherein the transparent portions of the wheel are open slots.

5. The system of claim 4 wherein the light source is an LED and the light detector is a photodiode.

* * * * *